United States Patent
Goggins

(10) Patent No.: US 7,083,340 B2
(45) Date of Patent: Aug. 1, 2006

(54) SYSTEMATIC LENTICULAR LENS SELECTION IN A DIGITAL PRINTING ENVIRONMENT

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 220 days.

(21) Appl. No.: 10/754,243

(22) Filed: Jan. 9, 2004

(65) Prior Publication Data

US 2005/0152729 A1    Jul. 14, 2005

(51) Int. Cl.
B41J 21/17 (2006.01)
G02B 27/10 (2006.01)

(52) U.S. Cl. ........................................ 400/70; 359/619

(58) Field of Classification Search .................. 400/70; 359/619, 629, 455; 358/1.2, 471, 1.55
See application file for complete search history.

(56) References Cited

U.S. PATENT DOCUMENTS

| | | | |
|---|---|---|---|
| 5,113,213 A | 5/1992 | Sandor et al. | 355/22 |
| 5,266,995 A | 11/1993 | Quadracci et al. | 355/77 |
| 5,278,608 A | 1/1994 | Taylor et al. | 355/22 |
| 5,436,738 A | 7/1995 | Manico | 358/503 |
| 5,457,515 A | 10/1995 | Quadracci et al. | 355/132 |
| 5,488,451 A | 1/1996 | Goggins | 355/77 |
| 5,581,402 A * | 12/1996 | Taylor | 359/463 |
| 5,592,332 A | 1/1997 | Nishio et al. | 359/619 |
| 5,617,178 A | 4/1997 | Goggins | 355/22 |
| 5,642,226 A * | 6/1997 | Rosenthal | 359/619 |
| 5,847,808 A | 12/1998 | Goggins | 355/22 |
| 5,896,230 A | 4/1999 | Goggins | 359/619 |
| 6,163,406 A * | 12/2000 | Morton | 359/619 |

(Continued)

FOREIGN PATENT DOCUMENTS

EP    0 953 935 A2    11/1999

*Primary Examiner*—Daniel J. Colila
*Assistant Examiner*—Wasseem H. Hamdan
(74) *Attorney, Agent, or Firm*—Whyte Hirschboeck Dudek SC

(57) ABSTRACT

Disclosed herein is a method and an apparatus for determining a lenticular lens resolution for use in digital press printing. The method and an apparatus consists of determining a digital press machine resolution d, setting a master interlaced image resolution m for a master interlaced image such that the master interlaced image resolution is equal to the machine resolution, setting a number of frames f to be included in the master interlaced image, and determining a lenticular lens resolution L according to the relationship $L=d/f$. The result is a digitally output lenticular image that can be have many applications, including use in products such as containers, packages, labels, and the like. The selection process accounts for variations in digital press machine resolutions, lenticular lens resolution variations, various screening algorithms, to yield a high quality, commercial-grade digitally output lenticular image.

20 Claims, 6 Drawing Sheets

U.S. PATENT DOCUMENTS

| | | |
|---|---|---|
| 6,177,217 B1 | 1/2001 | Agostinelli et al. ............ 430/22 |
| 6,198,544 B1 | 3/2001 | Wess et al. ................. 358/296 |
| 6,329,987 B1 * | 12/2001 | Gottfried et al. ........... 345/419 |
| 6,373,637 B1 | 4/2002 | Gulick et al. ............... 359/619 |
| 6,424,467 B1 | 7/2002 | Goggins ..................... 359/626 |
| 6,490,092 B1 | 12/2002 | Goggins ..................... 359/619 |
| 6,781,761 B1 | 8/2004 | Raymond ................... 359/619 |
| 2002/0075566 A1 | 6/2002 | Tutt et al. .................. 359/619 |
| 2002/0167679 A1 | 11/2002 | Nims et al. .................. 358/1.2 |
| 2003/0002160 A1 | 1/2003 | Johnson et al. ............. 359/619 |
| 2003/0016370 A1 | 1/2003 | Goggins ..................... 358/1.2 |
| 2003/0128865 A1 | 7/2003 | White ........................ 382/113 |
| 2003/0169468 A1 | 9/2003 | Menz et al. ................... 359/2 |
| 2003/0183695 A1 | 10/2003 | Labrec et al. ............... 235/487 |
| 2004/0157195 A1 | 8/2004 | Andresen ................... 434/130 |

* cited by examiner

SYSTEMATIC LENTICULAR LENS SELECTION IN A DIGITAL PRINTING ENVIRONMENT

BACKGROUND OF THE INVENTION

This invention relates generally to systematic lenticular lens selection in a digital printing environment, and more specifically to systematic lenticular lens selection for use with a digital printing press to create digitally output lenticular images.

Digital printing has revolutionized the printing industry in many ways. The introduction of digital press printing has brought specific benefits previously unparalleled in the lithographic printing arena, particularly in the cost and press time efficiencies associated with the production of make-ready samples, offline plate imaging, availability of "want one, print one" low press run viable capabilities, reduction of press operators, increasing sheet per hour production, individual variability without changing output rate, increasing quality of the press proofs, among others.

Particular media have been used with digital printing presses to create superior quality end products. However, digital press printing with lenticular plastic media has been limited, with the field plagued by problems of quality, reliability and lenticular selection problems. Part of the problem resides in the fact because a specific digital press machine will operate at a substantially fixed resolution, printing will occur at that resolution, which may result in scaling or improper screening of the desired images. Some problems associated with current attempts at lenticular digital press output include, among others, banding, contaminating, out of focus, soft images, double picture data, image degradation ghosting (latent images) and other artifacts or non-clean, crisp graphics.

Specifically, the selection process and incorporation of lenticular lens media into the digital press output process has been problematic. It has heretofore been a challenge to be able to determine a specific lenticular lens media resolution for a specific digital press to produce high quality, reproducible and commercially acceptable output not plagued by the aforementioned output problems. As digital press machine resolutions vary (from model to model) and even from machine to machine to some extent, it is increasingly desirable to be able to determine an optimal lenticular lens media resolution that accounts for the number of frames desired and the specific machine resolution. Further, it has been further identified as a need to be able to have software programming that works with a digital printing press to use the selected lenticular lens media parameters to create master files that, when printed to a lenticular lens media, are properly interlaced and minimize degradation of the individual images (comprising frames) that are printed to the selected lenticular lens media to create the lenticular image.

Moreover, because of the interrelationship among the digital press, lenticular lens media and the imaging files, there is a need for a lenticular lens digital imaging solution that can take individual or layered image frame files, interlace and combine them into a master image file, the parameters of which are set to correspond to a specific lenticular lens media, and from which the master image file can be printed via the digital press to the lenticular lens media. Since a given lenticular lens media will produce differing results on different digital presses, there is also a need to correspond the lenticular lens media to the specific digital press within the context of the digital imaging solution. At the same time there is additional benefit to having the selected lenticular lens be of a standard lens parameter, to further reduce digital lenticular printing costs.

It would be desirable to create digitally output lenticular images in which the lenticular lens has been systematically selected to accommodate both variations in digital printing presses from press to press, as well as variations in lenticular lens material from lot to lot. There is need to accommodate this information, along with other lenticular image parameters, to provide guidance in creating commercially acceptable digitally output lenticular images.

BRIEF SUMMARY OF THE INVENTION

Disclosed herein is a method for determining a lenticular lens resolution for use in digital press printing. The method comprises determining a digital press machine resolution d, setting a master interlaced image resolution m for a master interlaced image such that the master interlaced image resolution is equal to the machine resolution, setting a number of frames f to be included in the master interlaced image, and determining a lenticular lens resolution L according to the relationship $L=d/f$.

Other embodiments, aspects and advantages will become apparent in view of the teachings that follow, including the drawings.

BRIEF DESCRIPTION OF THE DRAWINGS

The drawings illustrate the best mode presently contemplated for carrying out the invention.

In the drawings.

DETAILED DESCRIPTION OF THE INVENTION

Figure 1:
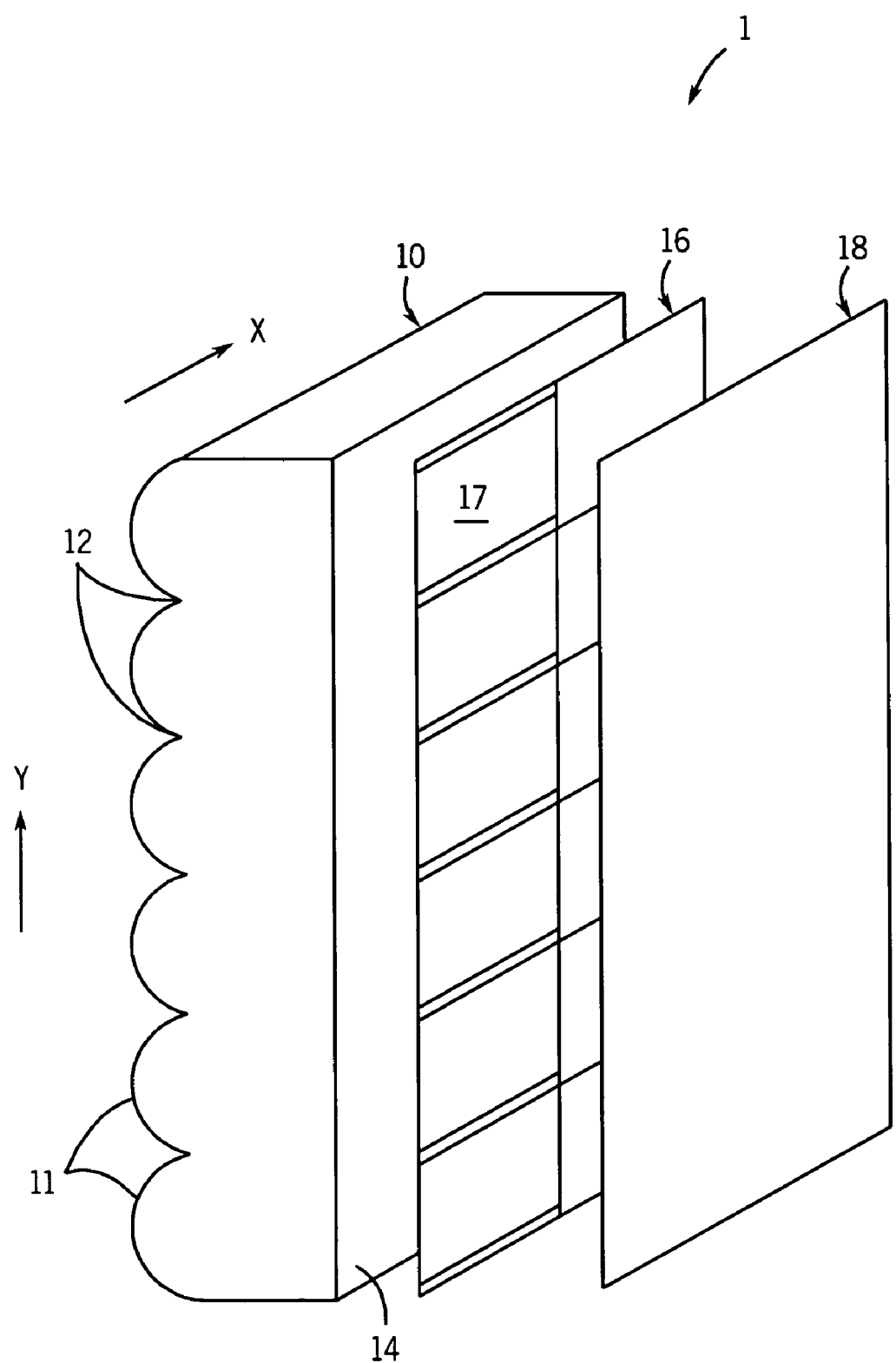
FIG. 1 is a schematic representation of a digitally output lenticular image made using the present invention.

FIG. 1 illustrates a digitally output lenticular image 1 made using the present invention. As shown, the image 1 includes a lenticular lens 10 which has a plurality of equally spaced, parallel lenticular lines 12 and a substantially planar back surface 14. The lenticular lines 12 define lenticules 11 through which a viewer can see an interlaced image 16, which is a composite multidimensional image. In general, interlaced image 16 is joined to the flat back surface 14 of lenticular lens 10. In one preferred embodiment, interlaced image 16 is printed directly to the back surface 14 of the lenticular lens 10, e.g., as taught in U.S. Pat. No. 5,457,515, the disclosure of which is incorporated herein by reference. Alternatively, the interlaced image 16 can be printed to a substrate 18 (e.g., paper, synthetic paper, plastic, metal, glass, or wood) and the substrate and image subsequently joined (e.g., using an adhesive) to the flat back surface 14 of the lenticular lens 10.

Lenticular lenses take the form of a transparent plastic sheet or web, and the sheet typically includes an array of identical curved or ribbed surfaces that are formed (e.g., cast, coated, embossed, extruded, or co-extruded) on the front surface of the plastic sheet. The back surface of the lens is typically flat. Each lenticule or individual lens is typically a section of a long cylinder that focuses on, and extends over, substantially the full length of an underlying image. Other lens shapes or profiles are possible (for instance, pyramidal, trapezoidal, parabolic, elliptical and the like). The lenticular lens is generally selected to accommodate both the underlying image and the distance from which the image will ordinarily be viewed (i.e., the viewing distance). Lenticular lenses and their technology are well-known and commercially available. Methods for using lenticular lens technology are described in detail in U.S. Pat. Nos. 5,113,213 and 5,266,995, the disclosures of which are incorporated herein by reference. Lenticular lens technologies are more fully described in U.S. Pat. Nos. 6,424,467 and 5,592,332 and U.S. patent application Publication No. U.S. 2003/0002160 A1, the disclosures of which are incorporated herein by reference.

A "lenticular image" (e.g., the image 1 of FIG. 1) comprises an interlaced image 16 (also called an underlying or precursor image) that has been joined to a lenticular lens 10. The precursor image is a composite of two or more component images or frames that are themselves preferably of photographic quality. The component images are selected based upon the desired features of the lenticular or final image. The component images are then arranged, segmented, interlaced and mapped to create the precursor image so that the precursor image corresponds with the lenticular lens in any convenient manner, e.g., such as those taught in U.S. Pat. Nos. 5,488,451; 5,617,178; 5,847,808 and 5,896,230, the disclosures of which are incorporated herein by reference. In this fashion, the precursor or interlaced image can be called a "composite, multidimensional image" as noted above. Interlaced images can be applied to surfaces of varying shapes, such as shapes including one or more curved regions, as taught in U.S. Pat. No. 6,490,092, the disclosure of which is incorporated herein by reference.

Still referring to FIG. 1, a primary goal of the method to be described is to ensure that correspondence between the interlaced image 16 and the lenticular lens 10 is achieved in the digital press environment (i.e., when the interlaced image is digitally printed to the lenticular lens or otherwise joined thereto). As used in the context of a lenticular image, "correspondence" means that each interlaced segment 17 is covered or substantially covered by one lenticule 11 and that the lenticule and interlaced segment are substantially congruent with one another. Correspondence is confirmed by viewing the interlaced image (i.e., the image comprising the interlaced segments arranged in the desired order) through the lenticular lens (i.e., the lenticular image) at a predetermined or desired viewing distance, and determined whether the appropriate multidimensional effect (e.g., flip, motion, 3D, or a combination thereof) has been achieved. Stated succinctly, the desired lenticular result is achieved, and therefore, the need to select or determine the appropriate lens resolution or pitch is paramount.

As a practical matter, there is typically not a precise one-to-one correspondence between an interlaced image segment of a corresponding interlaced image and the lenticule of the lens which overlays the segment. Each interlaced image segment can be made coarser (i.e., wider) or finer (i.e., narrower) than the lenticule of the lens which overlays it. Correspondence can be confirmed by viewing the interlaced image through the lenticular lens at a predetermined or desired viewing distance to determine whether the desired illusion of multidimensionality is created.

Figure 1A:
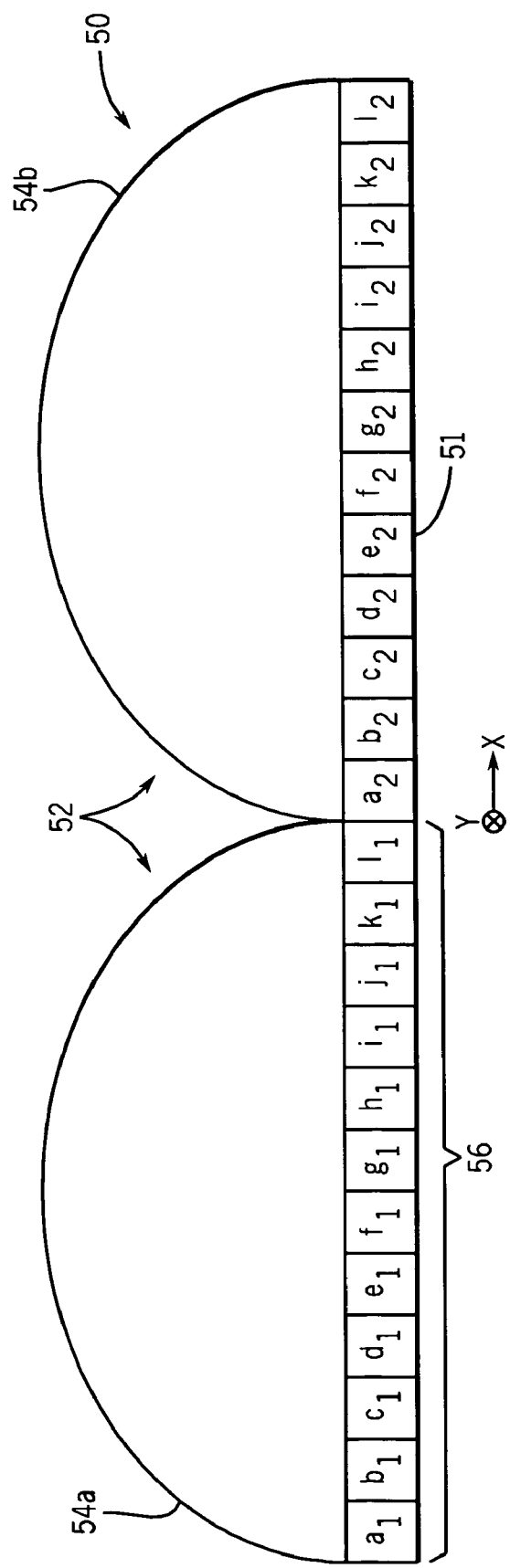
FIG. 1a is a schematic end view of a digitally output lenticular image in which an interlaced image is joined to a lenticular lens, and showing correspondence between interlaced image segments of the interlaced image and lenticules of the lenticular lens.

FIG. 1a shows a schematic end view of a digitally output lenticular image in which an interlaced image is joined to a lenticular lens, and further shows correspondence between interlaced image segments of the interlaced image and lenticules of the lenticular lens. The entire interlaced segment 56 is covered or substantially covered by lenticule 54a. In practice, lenticular image 50 will provide an illusion of multidimensionality to a viewer with little, if any, distortion. Achieving correspondence in the digital environment results in crisp, clear lenticular imaging, and thus, is paramount to overall commercial value for lenticular product sold.

Figure 2:
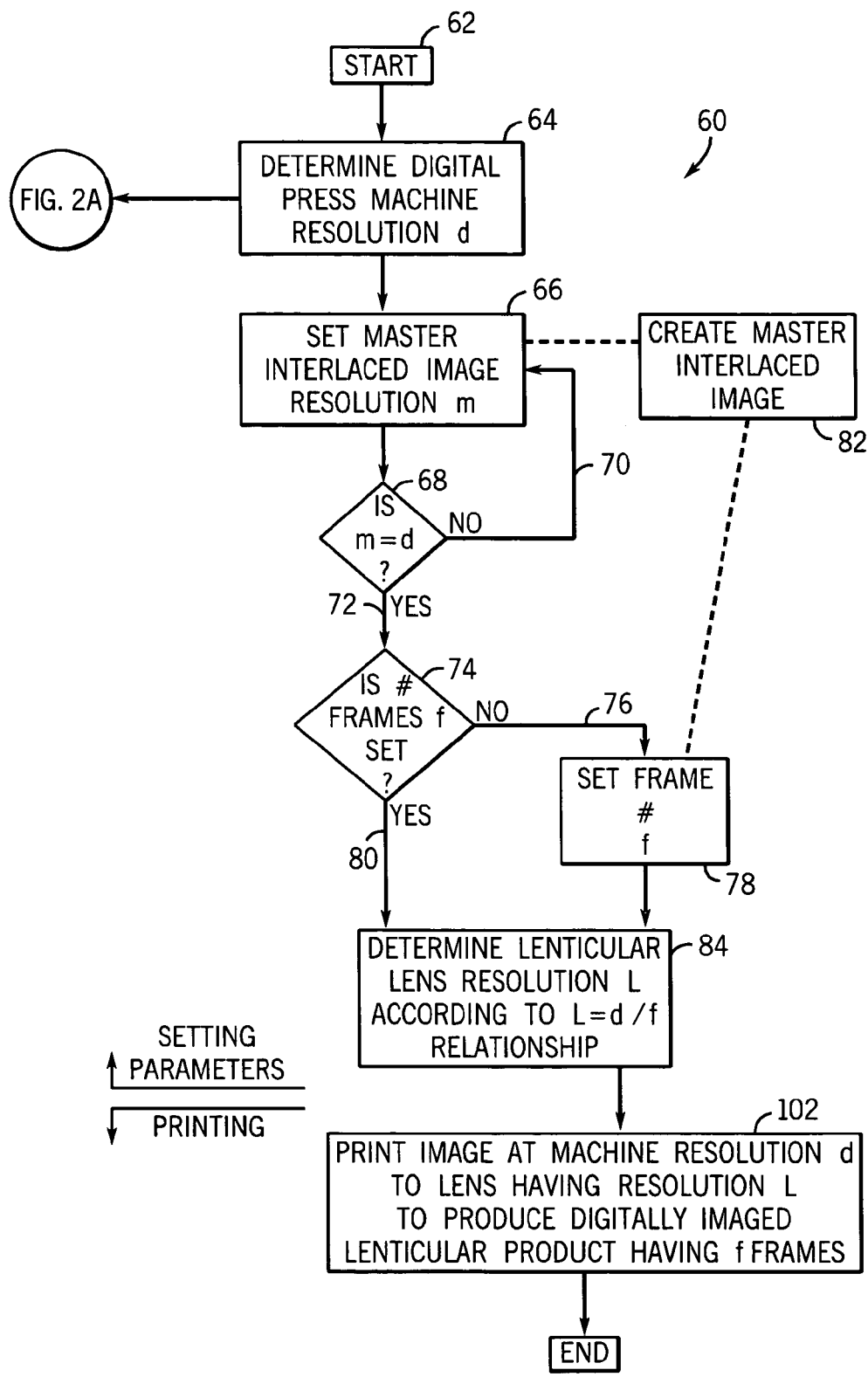
FIG. 2 is a flow chart illustrating a method for determining a lenticular lens for use in digital press printing according to one aspect of the present invention.

FIG. 2 is a flow chart illustrating a method, generally referred to by the numeral 60, for determining a lenticular lens for use in digital press printing according to one aspect of the present invention. One digital press suitable for use in the following methodology is the HP Indigo Press s2000, available from Hewlett-Packard, of Palo Alto, Calif. At the start 62, the method 60 comprises determining 64 a digital press machine or output resolution d, with the determining step further delineated in FIG. 2a and associated description below. A master interlaced image resolution m is set 66 for a master interlaced image such that the master interlaced image resolution is equal 68 to the machine resolution d. If not 70, the master interlaced image resolution is re-adjusted such that the equality will exist. Once the equality is established (i.e., that m=d), it is confirmed whether a number of frames f has been set 74. If not 76, the number frames f is set or selected 78 to be included in the master interlaced image, and if so 80, the number of frames is identified for use. The number of frames f can be determined at virtually any point in the process, and can be determined based on a variety of factors (e.g., intended multidimensional effect, complexity of the effect to be illustrated, technical limitations such as computer memory, etc.), however, it is of note that the number of frames f is an integer, and that integer must be identified or determined as part of the selection of the particular lenticular lens to be used. The steps of setting the master interlaced image resolution m and the setting of the number of frames f, namely steps 66 and 78, are accomplished preferably while creating the master interlaced image 82, explained further respect to the screen shots of FIG. 3 described below. Finally, a lenticular lens resolution L can be determined 84 according to the relationship $$L = d/f$$

Again, the resolution or pitch is typically identified as lenticules per inch ("lpi").

Figure 2A:
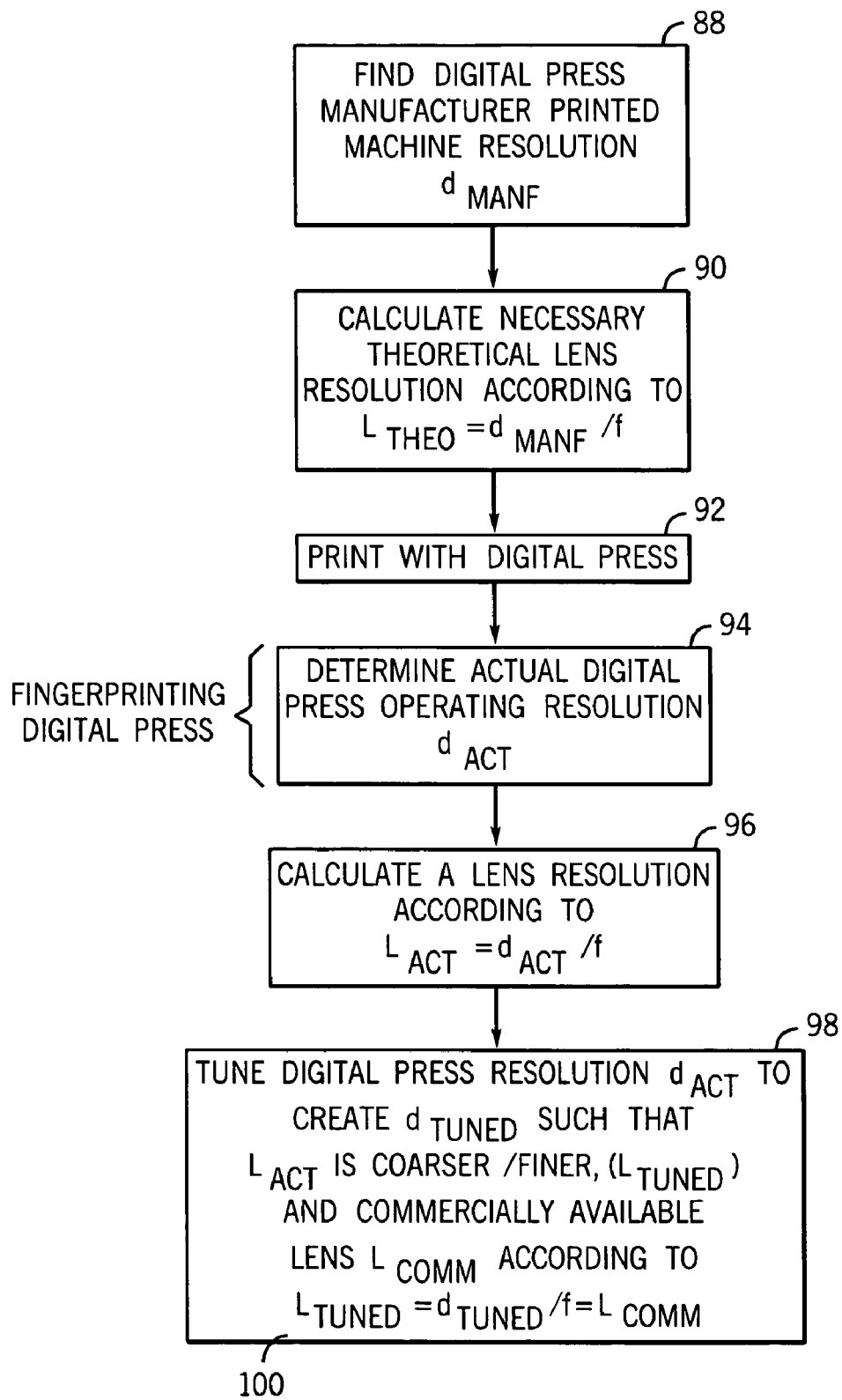
FIG. 2a illustrates a flow chart of additional steps that are taken in determining machine resolution as part of the method of FIG. 2.

FIG. 2a illustrates a flow chart of additional steps that are typically taken as part of the determining step 64. It is generally necessary to find 88 the machine or output resolution that is unique to the particular digital printing press being used to accomplish the printing of the interlaced image. Typically the manufacturer will identify what the machine resolution $d_{manf}$ is for a particular product. By way of example, in product literature, Hewlett-Packard identifies the s2000 as having a machine resolution $d_{manf}$ of 800 dots per inch ("dpi"). However, actual machine resolution $d_{act}$ may in fact vary from the stated machine resolution $d_{manf}$ in normal operation or use. Accordingly, a theoretical lenticular lens resolution $L_{theoretical}$ can be calculated 90 using the relationship:

$$L_{theoretical} = d_{manf}/f$$

An interlaced image can be printed 92 using the digital press, and the actual operating machine resolution $d_{act}$ can be determined 94 therefrom. For example, $d_{act}$ can be determined by end product technical inspection, or by comparison with outputs of known resolution. In this fashion, the digital printing press can be said to be "fingerprinted", that is, the identification of the machine resolution that accounts for variation from press to press.

An actual lens resolution $L_{act}$ can be calculated 96 according to the relationship:

$$L_{act} = d_{act}/f$$

To the extent that $L_{act}$ is a commercially available lens resolution, the lens selection process is complete. In most instances this will not be the case. To the extent that it differs, it is necessary to tune 98 the digital press such that printing in correspondence can occur. More specifically, the machine resolution $d_{act}$ is tuned to obtain a tuned machine resolution $d_{tuned}$. Tuning is accomplished by altering, adjusting, repositioning, or reconfiguring (to the extent possible) the mechanical, electromechanical and/or other operational components (e.g., mirrors, prisms, etc.) of the press to print the interlaced image such that it is in correspondence with the lenticular lens.

A tuned lenticular lens resolution $L_{tuned}$ can be calculated 100 according to the relationship:

$$L_{tuned} = d_{tuned}/f$$

In practice, $L_{tuned}$ will typically be coarser or finer than $L_{act}$ previously calculated. Ideally, $L_{tuned}$ is a value that matches a standard commercially available lenticular lens resolution $L_{comm}$ (e.g., 100 lpi, 150, lpi, 200 lpi, etc.). In practice, such commercially available lenses typically vary to some extent from the stated numbers, for example, the "100 lines per inch" or "100 line" lens is actually on the order of about 101.5 lpi. Accordingly, the tuning of the digital press preferably results in an equality summarized as:

$$L_{tuned} = L_{comm}.$$

In this manner, a commercially available lenticular lens can be used in a digital printing press, accounting for actual operating conditions, which can result in digitally imaged lenticular products having the desired number of frames, while providing an interlaced image that is in correspondence with the lenticular lens.

In one embodiment, exemplary lens resolutions can be in a range of between about 10 and about 250 lines per inch (lpi), although higher lens resolutions are possible and considered within the scope of the present invention. In another embodiment, exemplary lens resolutions can be in a range of between about 90 and 110 lpi. In another embodiment, exemplary lens resolutions can be in a range of between about 130 and about 160 lpi. In still another embodiment, exemplary lens resolutions can be in a range of between about 190 and about 210 lpi. And in yet another embodiment, exemplary lens resolutions can be about 101.6 lpi, 116.1 lpi, 135.5 lpi, 162.6 lpi, 203.2 lpi, 270.9 lpi, or 406.4 lpi.

Referring again to FIG. 2, following lens selection, and determination of the relevant parameters associated therewith, printing 102 of an interlaced image can be accomplished. More specifically, an interlaced image is printed 102 at a machine resolution d to the selected lenticular lens having a resolution L can be accomplished, thereby creating a digitally output lenticular image having f frames, where the image and lens are in correspondence.

Figure 3:
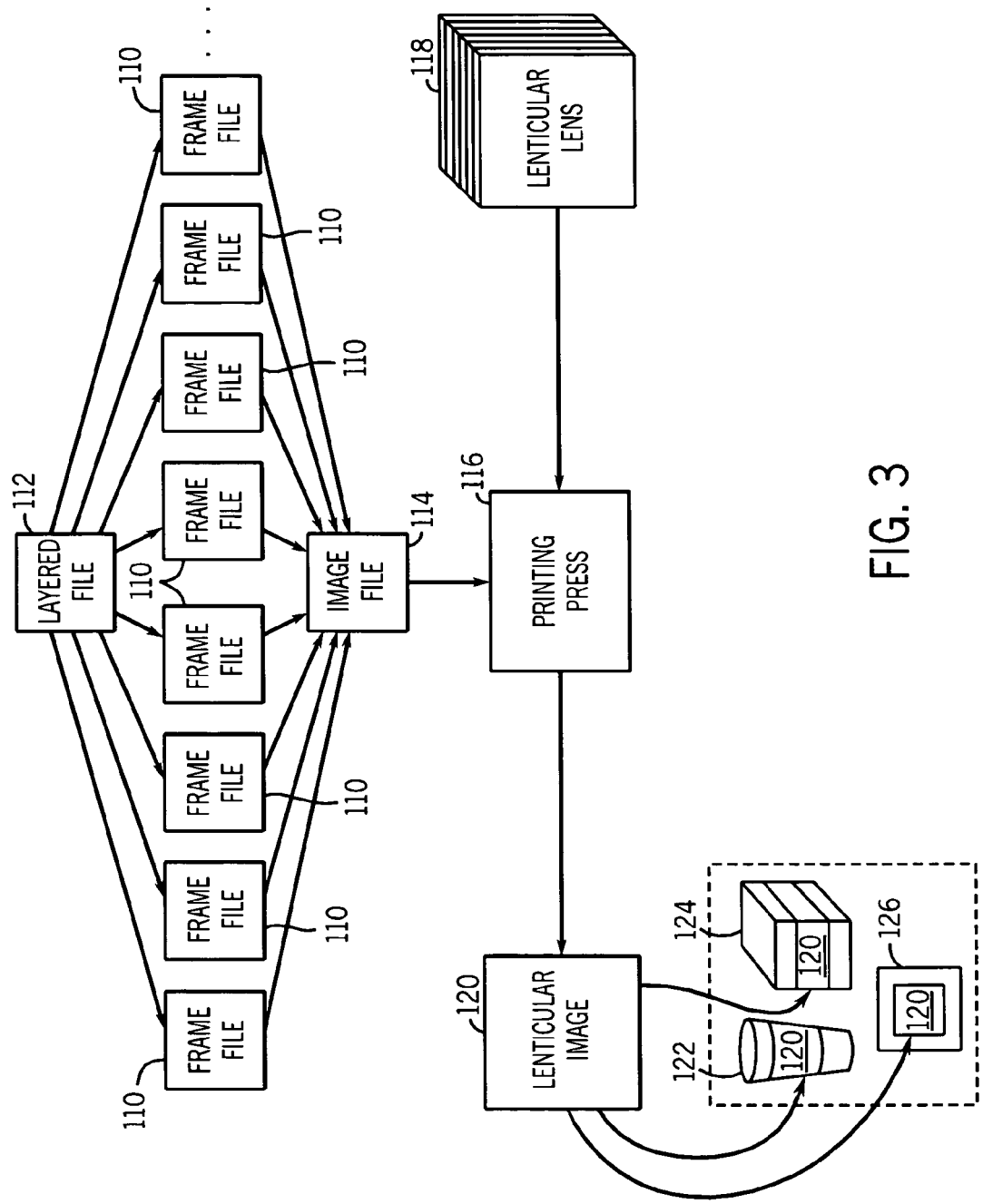
FIG. 3 is a schematic flow chart of a method for systematically selecting the lens for use in producing a digitally output lenticular image according to one aspect of the present invention.

FIG. 3 is a schematic flow chart of a method for systematically selecting the lens for use in producing a digitally output lenticular image according to one aspect of the present invention. Initially, a plurality of frame files 110 is created and the frame files include each image or frame to be included in the interlaced image. Alternatively, layered file 112 can be provided from which the plurality of frame files 110 can be created, the layered file and frame files created using commercially available software, such as Adobe® Photoshop®. In the examples shown, there are eight (8) frame files, but the number of frame files can vary to convenience (e.g., 6, 12, 24, etc.) depending on, among other things, the multidimensional effect to be created. In general, there is typically a one-to-one correlation between the number of frames f and the number of frame files. For example, in a simple flip image, there would typically be 2 frame files created for 2 base images or frames. Frames may be repeated as necessary, for example to give greater weight in the overall interlaced image to certain frames or images, and these are know in the art as "hero" frames, and the process is generally called "heroing". Similarly, the number of layers of imaging in the layered file can vary depending, for example, on the complexity and number of base images to be included in the interlaced image. The layered file(s) can take a variety of formats, for example, TIFF, PSD (available from Adobe®), among others, as is desired by the creator. The frame file(s) can also take a variety of formats, for example, TIFF, GIF, or JPEG, among others.

Figure 4:
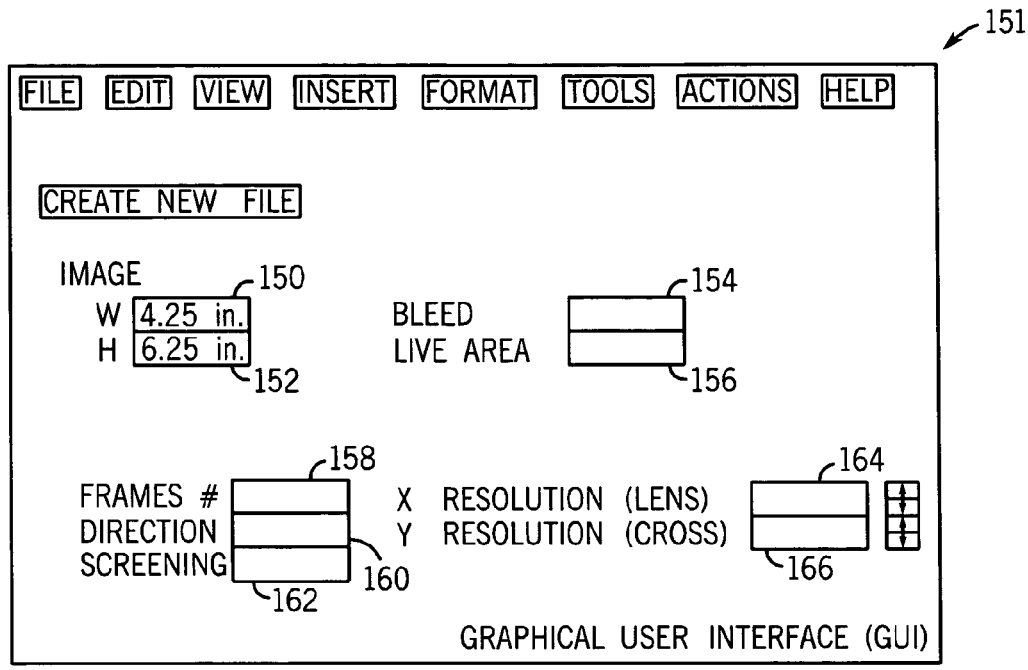
FIG. 4 is a schematic illustration of a computerized data field that can be populated to accomplish at least one aspect of the present invention.
Figure 5:
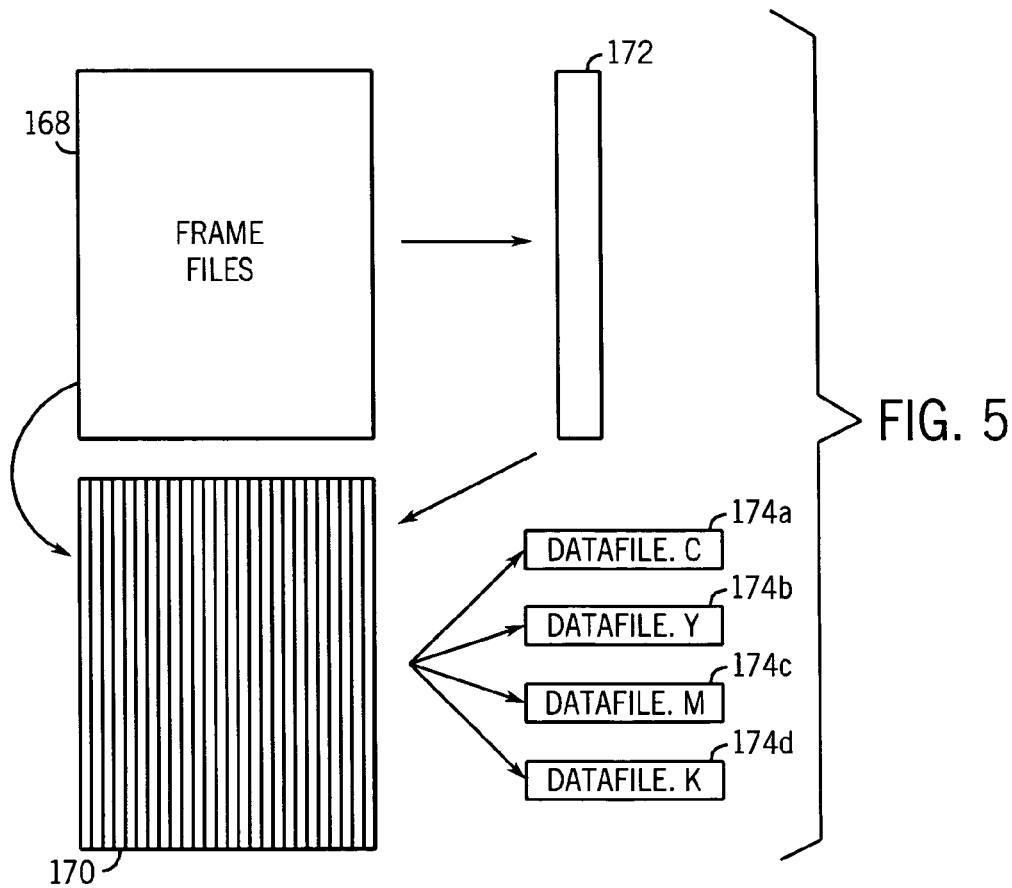
FIG. 5 is a schematic graphical representation of the compressing, interlacing and creation of frame files that may be used in at least one aspect of the present invention.

A master interlaced image file 114 is created from the frame files 110, and this is illustrated in greater detail in FIGS. 4–5. FIG. 4 is a schematic illustration of a computerized data field that can be populated to accomplish at least one aspect of the present invention. FIG. 5 are schematic graphical representations of a frame and a master file that are created as part of at least one aspect of the present invention. In FIG. 4, block area 151 is representative of a graphical user interface (GUI) that can be part of a commercial software program (which can be customized if necessary). Exemplary data fields can include, for example, image width 150, image height 152, image bleed 154, live area for the image 156. Other pertinent information can be included or otherwise accounted for in printing the interlaced image digitally to the desired and selected lenticular lens, for example, the number of frames in the image 158, the direction or image orientation 160, and the particular screening technique (e.g., stochastic) 162 to be used.

"Screening" refers to the process of converting a continuous tone image to a matrix of dots in sizes proportional to the highlights (i.e., the lightest or whitest area of an image) and shadows (i.e., the darkest portions of the image) of the continuous tone image. Image screening techniques can include, for example, half-tone screening and stochastic screening. In conventional half-tone screening, the number of dots per inch remains constant, although the size of the dots can vary in relation to the tonal range density of the pixel depth that they represent. Stochastic or frequency-modulated (FM) screening can create the illusion of tone. Stochastic screening techniques typically yield higher resolutions than are typically obtained in conventional half-tone dot screening. Stochastic screening utilizes finer spots, and results in a higher resolution. In general, stochastic screening is preferable when smaller or finer images are utilized, and when it is desired to illustrate greater detail.

It is further contemplated that screening, whether using halftone, stochastic, or any other technique, can take place prior to interlacing, after interlacing but prior to sending the interlaced image to an output device (preferably a high resolution output device), or after sending the interlaced image to the Raster Image Processor, that is, a "RIP", (e.g., Adobe® PostScrpt®) of the output device.

Still referring to FIGS. 4 and 5, the appropriate image resolution corresponding with the lenticular lens resolution or pitch is identified, taking into account generally more than one direction, for example a first direction 164 coinciding with the lenticules of the lens, and a second resolution 166 coinciding with a direction perpendicular to, or across, the lenticules of the lens. These directions are indicated with respect to the lens 10 of FIG. 1.

Referring to FIG. 5, the creation of the master interlaced image is shown. More specifically, using the data obtained via the fields shown in FIG. 4, the frame files 168 can either be directly interlaced using the screening methodology of FIG. 4 to create the master interlaced image 170, or alternatively, each of the frame files 168 can be compressed 172 prior to screening the files and creating the master interlaced image file. Whether screening or interlacing takes place first, with respect to the screening technique or algorithm used, it is preferable to created the master interlaced image such that little, if any, degradation occurs to the master interlaced image. Master interlaced image 170 can be separated and stored in individual color data files correlating with component colors. In the embodiment shown, subtractive color scheme CYMK is used, but in an alternative embodiment, additive color scheme such as RGB may be utilized. It is contemplated that other color models, including but not limited to, hexachrome, hi-fi color, extended color gamut (e.g., including light cyan "c" and regular cyan "C"), spot colors, bumps, among others. In this way, the master interlaced image 170 can be screened according to individual colors forming the basis for each individual color data file 174*a–d*.

Turning to FIG. 3, having obtained the master interlaced image file 114, as well as associated component color data files 174 *a–d* (FIG. 5), the file information can be sent to a digital printing press 116, such as the H-P Indigo press s2000, or other suitable digital press. The lenticular lens 118 of known resolution, as determined according to the methodology outlined above in FIGS. 2 and 2*a*, can be, in one embodiment, utilized as the media or substrate upon which interlaced image (created from the master interlaced file) is digitally printed. More specifically, the lens is positioned to receive the printed image directly on its flat back surface. Alternatively, the interlaced image can be printed to another substrate (e.g., paper, plastic, metal, glass, or wood) and the substrate with the printed interlaced image thereon subsequently joined (e.g., via an adhesive) to the lenticular lens in a manner that achieves correspondence between the lens and the image. The result is a digitally output lenticular image 120 which can itself be a finished product, or alternatively, incorporated as a unique or significant feature of a subsequent product, for example, a container (e.g., a cup) 122, a package 124, or a label 126.

Of course, from application or overall project perspective, the appropriate lenticular lens is selected to accommodate the image and the predetermined viewing distance. For a large application, such as a billboard or bus shelter, or a vending machine facade, a thick, coarse lenticular lens is usually preferred. For smaller application, such as a cup, a label or a package, a fine lenticular lens is typically preferred. Coarse lenticular lenses have fewer lenticules per linear inch than fine lenticular lenses. Other factors often considered in the choice of a lenticular lens include the thickness, flexibility, the viewing distance, the cost of the lens, among others. Increasingly, finer lenticular lenses are becoming more possible and commercially feasible.

INDUSTRIAL EXAMPLE 100 lpi Lens

In this example, it is desired to print, using the H-P Indigo s2000 digital printing press, an interlaced image to a lenticular lens that is as close as possible to a standard 100 lpi lens. The product literature for the s2000 indicates that it operates at an 800 dpi machine resolution. As such, theoretically, for an interlaced image made up of eight (8) frames, the lens selected should be exactly 100 lpi (i.e., 800 dpi/8 frames). However, upon experimentation with actual printing using the s2000, the actual machine resolution is determined ("fingerprinted") to be 812.8 dpi. Therefore, a desired lenticular lens resolution would be 101.6 lpi (i.e., 812.8 dpi/8 frames). However, in this example, the commercially available lens is 101.5 lpi for a stated "100 lpi" lenticular lens. Accordingly, the s2000 printing press machine resolution is further tuned downward to an optimal tuned resolution of 812 dpi (101.5 lpi times 8 frames) by internally adjusting one or more physical press characteristics. In this fashion, this tuned machine resolution, printed to this lot of lenticular lens material of a determined pitch, will result in a digitally output lenticular product in which the lens and image are in correspondence.

Methods have been described and outlined in a sequential fashion. Still, modification, rearrangement, reordering, or the like, of the methods is contemplated and considered within the scope of the appending claims. More generally, while the present invention has been described in terms of one or more preferred embodiments, it is recognized that equivalents, alternatives, and modifications, aside from those expressly stated, are possible and within the scope of the appending claims.

What is claimed is:

1. A method for determining a lenticular lens resolution for use in digital press printing, the method comprising:
   determining a digital press machine resolution d;
   setting a master interlaced image resolution m for a master interlaced image such that the master interlaced image resolution is equal to the machine resolution;
   setting a number of frames f to be included in the master interlaced image; and
   determining a lenticular lens resolution L according to the relationship L=d/f.

2. The method of claim 1 where the lens resolution L is between about 10 and about 250 lines per inch (lpi).

3. The method of claim 2 wherein the lens resolution L is between one of: about 90 and 110 lpi, about 130 and about 160 lpi, and about 190 and about 210 lpi.

4. The method of claim 3 wherein the lens resolution L is about 101.6 lpi, 116.1 lpi, 135.5 lpi, 162.6 lpi, 203.2 lpi, 270.9 lpi, or 406.4 lpi.

5. The method of claim 1 wherein the determining step includes determining an actual operating machine resolution $d_{act}$.

6. The method of claim 5 further comprising tuning the machine resolution $d_{act}$ to obtain a tuned machine resolution $d_{tuned}$.

7. The method of claim 6 further comprising determining a lenticular lens resolution $L_{tuned}$ according to the relationship:

$$L_{tuned}=d_{tuned}/f.$$

8. The method of claim 1 further wherein the determining step includes determining an actual lens resolution $L_{act}$ according to the relationship:

$$L_{act}=d_{act}/f.$$

9. The method of claim 1 further comprising creating a master interlaced image file from a plurality of image frame files, the master interlaced image file having data for creating the master interlaced image.

10. A method of outputting an interlaced image using a digital printing press to create a digitally output lenticular image, the method comprising:
   determining a digital press machine or output resolution d;
   setting a master interlaced image resolution m for a master interlaced image such that the master interlaced image resolution is equal to the machine resolution;
   setting a number of frames f to be included in the master interlaced image; and
   determining a lenticular lens resolution L according to the relationship L=d/f; and
   outputting the interlaced image using the digital printing press to create a digitally output lenticular image comprising a lenticular lens having the lenticular lens resolution L.

11. The method of claim 10 further comprising creating a plurality of frame files corresponding to the number of frames f to be included in the master interlaced image.

12. The method of claim 10 further comprising creating a master interlaced image file using the plurality of frame files, the master interlaced image file for output in a digital printing press.

13. The method of claim 10 further comprising joining the interlaced image to a lenticular lens having a plurality of lenticules such that the interlaced image is in correspondence with the lenticules of the lens, thereby creating the digitally output lenticular image comprising a lenticular lens having the lenticular lens resolution L.

14. The method of claim 13 farther comprising printing the interlaced image directly to the flat back surface of the lens.

15. The method of claim 13 further comprising printing the interlaced image to a substrate and subsequently joining the substrate comprising the interlaced image to the flat back surface of the lens.

16. The method of claim 15 wherein the substrate is one of paper, synthetic paper, plastic, metal, glass, or wood.

17. The method of claim 11 further comprising compressing each of the plurality of frame files and interlacing the compressed frame files to create the master interlaced image file.

18. The method of claim 11 further comprising interlacing the compressed frame files to create the master interlaced image file.

19. The method of claim 18 further comprising screening the master interlaced image file into a plurality of color screened data files.

20. A digitally output lenticular image comprising:
   a lenticular lens having a plurality of lenticules and a flat back surface opposite the lenticules, the lens having a lenticular lens resolution L determined by the number lenticules per inch (lpi); and
   a digitally output interlaced image having a number of frames f joined to the flat back surface of the lenticular lens, the interlaced image output with a digital press having a determined output resolution d, and the interlaced image created from an interlaced image file having a master interlaced image resolution m that is substantially equal to the output resolution d;
   wherein the lenticular lens resolution L is determined according to the relationship L=d/f.

* * * * *